(12) United States Patent
Li et al.

(10) Patent No.: US 12,003,276 B2
(45) Date of Patent: Jun. 4, 2024

(54) 10G RATE OLT TERMINAL TRANSCEIVER INTEGRATED CHIP BASED ON EPON WITH EML LASER

(71) Applicant: XIAMEN EOCHIP SEMICONDUCTOR CO., LTD, Xiamen (CN)

(72) Inventors: Jinghu Li, Xiamen (CN); Zhang Fan, Xiamen (CN); An Lin, Xiamen (CN)

(*) Notice: Subject to any disclaimer, the term of this patent is extended or adjusted under 35 U.S.C. 154(b) by 0 days.

(21) Appl. No.: 18/357,214

(22) Filed: Jul. 24, 2023

(65) Prior Publication Data
US 2023/0388019 A1  Nov. 30, 2023

(30) Foreign Application Priority Data
May 25, 2022 (CN) .......................... 202210577081.6

(51) Int. Cl.
*H04B 10/00* (2013.01)
*H04B 10/40* (2013.01)
*H04Q 11/00* (2006.01)

(52) U.S. Cl.
CPC ......... *H04B 10/40* (2013.01); *H04Q 11/0067* (2013.01)

(58) Field of Classification Search
CPC ........ H04B 10/40; H04B 10/501; H04B 1/40; H04Q 11/0067; Y02D 30/70
See application file for complete search history.

(56) References Cited

U.S. PATENT DOCUMENTS

| | | | |
|---|---|---|---|
| 2006/0171714 A1* | 8/2006 | Dove ................ | H04Q 11/0067 398/71 |
| 2012/0045202 A1 | 2/2012 | Jiang et al. | |
| 2014/0023374 A1* | 1/2014 | Yuda ...................... | H04J 14/08 372/38.02 |
| 2018/0006728 A1* | 1/2018 | Yuda ...................... | H04B 10/40 |
| 2020/0200986 A1* | 6/2020 | Funada ................. | H01R 12/72 |
| 2021/0083770 A1* | 3/2021 | Lam ...................... | H04B 10/272 |
| 2021/0288720 A1* | 9/2021 | Li ......................... | H04Q 11/0067 |
| 2023/0388010 A1* | 11/2023 | Lin ..................... | H04Q 11/0067 |
| 2023/0388011 A1* | 11/2023 | Li ........................... | H04B 10/40 |
| 2023/0388019 A1* | 11/2023 | Li ......................... | H04B 10/501 |
| 2023/0388022 A1* | 11/2023 | Li ..................... | H04Q 11/0067 |
| 2023/0388682 A1* | 11/2023 | Li ........................ | H04B 10/038 |

FOREIGN PATENT DOCUMENTS

| | | |
|---|---|---|
| CN | 101185247 A | 5/2008 |
| CN | 102917283 A | 2/2013 |
| CN | 214626994 U | 11/2021 |
| JP | 2013219599 A | 10/2013 |

\* cited by examiner

*Primary Examiner* — Agustin Bello
(74) *Attorney, Agent, or Firm* — Novoclaims Patent Services LLC; Mei Lin Wong

(57) ABSTRACT

A 10G rate OLT terminal transceiver integrated chip based on EPON with EML laser includes: a burst mode receiver RX which processes signal amplification and selects one of the two preset channels as a working channel for output through receiving an external command from a host; a continuous mode transmitter TX which receives the electrical signal attenuated by a PCB board, and selects a bypass BYPASS path or a clock data recovery CDR path according to a degree of attenuation to drive the EML laser; a digital control unit DIGITAL for path selection of the burst mode receiver RX; and a power module POWER, wherein the opening and closing of the two rate channels are controlled by the level judgment unit and the output blocking unit.

9 Claims, 3 Drawing Sheets

10G RATE OLT TERMINAL TRANSCEIVER INTEGRATED CHIP BASED ON EPON WITH EML LASER

FIELD OF INVENTION

The present invention relates to the field of integrated circuit and optical communication.

DESCRIPTION OF RELATED ARTS

In an optical communication central office equipment OLT (abbreviation for Optical Line Termination, optical line terminal), a burst limiting amplifier LA completes the limit amplification of the different amplitude electrical signals transmitted by the upper burst transimpedance amplifier TIA. LA also includes a LOS (Loss of Signal, loss of signal) module, which judges whether the LA input signal is noise or is a signal that meets the requirements and performs the operation of turning off or opening the main channel. The continuous Laser Diode Driver LDD converts the data flow of the electrical signal into a modulated current to drive the laser to emit light and transmit the optical signal. The LDD includes a threshold configuration module to cooperate with the automatic optical power control APC and automatic temperature control ATC modules to complete the feedback control of the LDD.

The commonly used laser types are: VCSEL, DFB and EML. Vertical cavity surface emitting laser VCSEL (Vertical Cavity Surface Emitting Laser) has low production cost and is suitable for high-speed and short-distance transmission. DFB (Distribution-Feedback Laser) has a relatively high production cost and can provide high power for long-distance transmission. EML (Electro-Absorption Modulation with Laser) is expensive and has a high voltage requirement, but it can be used for transmission distance of over 100 km. The DFB laser controls the intensity of the output light by current input. The bias current BIAS biases the DFB laser at the light-emitting threshold point, and then outputs the modulation current MOD through the laser driver to control the light on and off status of the DFB laser which is corresponding to 1 and 0 of the data stream. However, changes in the injection current lead to changes in the carrier concentration, which in turn causes changes in the refractive index and wavelength. The change of the wavelength causes the chirp effect, and the dispersion of the fiber itself eventually leads to the extension of the pulse width and the distortion of the signal. Therefore, the upper limit of transmission distance using DFB laser is 10 km. The transmission rate is also limited by the length of time the modulation current is input.

In order to increase the transmission distance of the laser, an EML laser can be used. The injection current (BIAS current) of the EML laser does not change, and it can output continuous light. The light intensity is changed by the external electro-absorption modulator using the electro-absorption effect to achieve the purpose of signal modulating. The electro-absorption modulator does not apply an external electric field, the incident light passes through the material without being absorbed, and signal 1 is transmitted when it emits light. When an external electric field is applied, the incident light is absorbed by the material, and signal 0 is transmitted when the light is turned off. Therefore, the laser driver can modulate the intensity of the output light field by changing the output voltage amplitude according to the data stream.

EML lasers are superior to DFB lasers in terms of chirp effect, extinction ratio, eye diagram quality, jitter level, and transmission distance. The advantages of DFB lasers are small size, lower purchase price and lower power consumption.

In order to ensure that the EML laser meets the strict protocol requirements for carrier-grade signal transmission, it is necessary to control the EML laser to work in a specific temperature range (55° C.-65° C.), and uses its integrated TEC (Thermo Electric Cooler) to control the work temperature. The cooler also consumes most of the power consumption while ensuring the working temperature of the laser. Therefore, under the premise of controlling the current and overall power consumption of the optical module (<550 mA), the transceiver integrated chip used with the EML laser needs to further compress power consumption.

Compared with the more advanced GPON technology, the beam splitting and bandwidth of EPON technology are much lower. However, based on the huge amount of optical networks laid under the EPON standard and the low cost of use, EPON technology still has broad market prospects in developing countries. Also, with the competition in the market and the advancement of the new era, it is necessary to upgrade the architecture and speed of the OLT transceiver integrated chip based on EPON technology and EML laser for ultra-long-distance transmission.

Therefore, in view of the above deficiencies, it is necessary to upgrade the rate of the OLT terminal based on the low-cost EPON standard so that it can meet the needs of the market and achieve low cost and high rate.

SUMMARY OF THE PRESENT INVENTION

An object of the present invention is to solve the existing low rate problem of the existing low cost OLT terminal based on EPON standard, and provide a 10G rate OLT terminal transceiver integrated chip based on EPON with EML laser, which can effectively improve the signal transmission rate based on EPON optical network and can well control the overall hard power consumption while the user can switch between low-speed or high-speed transmission rates and adjust configurations that are conducive to eye diagram quality according to his or her needs.

According to the present invention, a 10G rate OLT terminal transceiver integrated chip based on EPON and EML laser comprises: a burst mode receiver RX, a continuous mode transmitter TX and a digital control unit DIGITAL, and a power module POWER;
  wherein the burst mode receiver RX amplifies an electrical signal which is originated from an optical signal from each ONU client and processed through a burst mode receiver TIA, and the burst mode receiver RX comprises two channels with different rates and selects one of the two channels to open, defining a working channel, so the electrical signal is output from the working channel;
  the continuous mode transmitter TX receives the electrical signal attenuated by a PCB board, and in response to a degree of attenuation, selects a bypass path BYPASS for transmission or outputs the electrical signal after a signal quality of the electrical signal is processed and improved by a clock data recovery path CDR to drive the EML laser;
  the digital control unit DIGITAL controls a path selection of the continuous mode transmitter TX according to an external command;

a host controls the channel selection of the burst mode receiver RX through a chip pin RS; and the power module POWER is arranged to provide power supply to the chip.

Preferably, the burst mode receiver RX comprises a first input buffer, a 10G rate channel, a 1G rate channel, a level judgment unit and an output blocking unit;

wherein an output signal of the burst transimpedance amplifier TIA of the OLT terminal is connected to an input terminal of the first input buffer through chip pins RX_INP and RX_INN, and the first input buffer sends the received signal to the level judgment unit for judgment, the level judgment unit limits, amplifies and outputs the signal having a level higher than a level threshold through the 10G rate channel or the 1G rate channel;

the 10G rate channel comprises a 10G burst-mode limiting amplifier Burst LA_10G, a 10G rate amplifier A1, and 10G current mode logic output interface output port CML 10G; the 1G rate channel comprises a 1G burst-mode limiting amplifier Burst LA_1G, a 1G rate amplifier A2, and a 1G forward emitter coupled logic output port PECL 1G; an output terminal of the first input buffer is connected with the input terminal of the 10G burst-mode limiting amplifier Burst LA_10G and the input terminal of the 1G burst-mode limiting amplifier Burst LA_1G at the same time, an output terminal of the 10G burst-mode limiting amplifier Burst LA_10G is connected to an input terminal of the 10G current mode logic output interface output port CML 10G, the 10G current mode logic output interface output port CML 10G outputs a 10G channel signal through chip pins OUTP_10G and OUTN_10G, an output terminal of the 1G burst-mode limiting amplifier Burst LA_1G is connected to an input terminal of the 1G forward emitter coupled logic output port PECL 1G, the 1G forward emitter coupled logic output port PECL 1G outputs a 1G channel signal through chip pins OUTP_1G and OUTN_1G;

the level judgment unit determines a selection result by comparing the signal with the signal threshold, and controls an opening and a closing of the 10G rate amplifier A1 and the 1G rate amplifier A2 through the output blocking unit to realize the selection of one of the 10G rate and 1G rate channels.

Preferably, the continuous mode transmitter TX comprises a second input buffer, a bypass ByPass, a clock data recovery CDR, a EML laser driver, and a bias current control unit, wherein one of the bypass ByPass path or the clock data recovery CDR path is selected to activate, an attenuated signal formed by an original high-speed electrical signal (the burst data packet) passing through a metal trace on a PCB board is connected to the second input buffer through the chip pins TX_INP and TX_INN, then the second input buffer transmits the attenuated signal to the input terminal of the EML laser driver along the activated path; an output terminal of the EML laser driver is connected to a control terminal of the EML laser through a chip pin TX_OUTP;

a bias current control unit configures a bias current for the EML laser;

the host sends a command for turning off the bias current to the chip through a chip pin TXDIS to turn off the continuous mode transmitter TX.

Preferably, the activation of one of the bypass ByPass or the clock data recovery CDR path is controlled by the digital control unit Digital according to an external command.

Preferably, wherein the activation of one of the bypass ByPass path or the clock data recovery CDR path is controlled by the host switching a path automatically by itself, if a detected rate of the original high-speed electrical signal is below 8G, the signal attenuation is not serious, and the bypass ByPass path is activated; if the detected rate of the original high-speed electrical signal is 8G-14G, the signal attenuation is serious, and the clock data recovery CDR path is activated by the host.

Preferably, digital control unit Digital comprises a register digital core, an analog-to-digital converter ADC, a I$^2$C slave and a temperature sensor Temp Sensor;

wherein an output terminal of the temperature sensor Temp Sensor is connected to a temperature signal input terminal of the register digital core through the analog-to-digital converter ADC;

an input terminal of I$^2$C slave is connected to a pin SCL of a clock chip; an input and output ports of the I$^2$C slave are connected to a chip pin SDA of an external command; an output terminal of the FC slave is connected to an external command input terminal of the register digital core, and the register digital core controls a path activation of the continuous mode transmitter TX; the register digital core also realizes a configuration of the burst mode receiver RX and the continuous mode transmitter TX through control ports.

Preferably, the control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

Preferably, the control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL; and a modulation voltage peak-to-peak control PEAK_CTRL;

wherein an input terminal of the optical power control port APC is connected to a chip pin MPD for current monitoring.

Preferably, the power module POWER comprises a DC power supply VDC, a DC chopper DC/DC, and resistors R1 and R2;

wherein the DC power supply VDC provides working power for the EML laser driver while at the same time the DC chopper DC/DC converts the DC power supply VDC into a DC power supply VCC1 and outputs it through a pin VOUT; the DC power supply VCC1 provides working power for the burst mode receiver RX, the continuous mode transmitter TX and the digital control unit Digital respectively;

an output terminal VOUT of the DC chopper DC/DC is connected to one end of the resistor R1 and a chip pin CAP1 simultaneously; the chip pin CAP1 is grounded through a capacitor C2;

another end of the resistor R1 is simultaneously connected to one end of the resistor R2 and a feedback signal terminal FB of the DC chopper DC/DC;

another end of the resistor R2 is grounded;

a switch input port SW of the DC chopper DC/DC is connected to a chip pin SW1; the chip pin SW1 is connected to a positive terminal of the DC power supply VDC through an inductor L1;

a power supply voltage port VCC of the DC chopper DC/DC is connected to a chip pin VDC; the chip pin VDC is connected to the positive terminal of the DC power supply VDC; and an enable port EN of the DC chopper DC/DC is connected to a chip pin EN1; the chip pin EN1 is connected to one end of a capacitor C1 and the positive terminal of the DC power supply VDC at the same time; another end of the capacitor C1 is grounded, and a negative terminal of the DC power supply VDC is grounded.

Preferably, the power module POWER comprises a DC power supply VDC, a DC power supply VCC, a first DC chopper DC/DC, a second DC chopper DC/DC, and resistors R1-R4;

wherein the first DC chopper DC/DC converts the DC power supply VDC into a DC power supply VCC1 and outputs it through a pin VOUT; the DC power supply VCC1 provides working power for the burst mode receiver RX, the continuous mode transmitter TX and the digital control unit Digital respectively;

an output terminal VOUT of the first DC chopper DC/DC is connected to one end of the resistor R1 and a chip pin CAP1 simultaneously; the chip pin CAP1 is grounded through a capacitor C2;

another end of the resistor R1 is simultaneously connected to one end of the resistor R2 and a feedback signal terminal FB of the first DC chopper DC/DC;

another end of the resistor R2 is grounded;

a switch input port SW of the first DC chopper DC/DC is connected to a chip pin SW1; the chip pin SW1 is connected to a positive terminal of the DC power supply VDC through an inductor L1;

a power supply voltage port VCC of the first DC chopper DC/DC is connected to a chip pin VDC; the chip pin VDC is connected to the positive terminal of the DC power supply VDC;

an enable port EN of the first DC chopper DC/DC is connected to a chip pin EN1; the chip pin EN1 is connected to one end of a capacitor C1 and the positive terminal of the DC power supply VDC at the same time; another end of the capacitor C1 is grounded, and a negative terminal of the DC power supply VDC is grounded;

the second DC chopper DC/DC converts the DC power supply VCC into a DC power supply VCC2 and outputs it through a pin VOUT; the DC power supply VCC2 provides working power for the EML laser driver;

the output terminal VOUT of the second DC chopper DC/DC is connected to one end of the resistor R3 and a chip pin CAP2 simultaneously; the chip pin CAP2 is grounded through a capacitor C4;

another end of the resistor R3 is simultaneously connected to one end of the resistor R4 and a feedback signal terminal FB of the second DC chopper DC/DC;

another end of the resistor R4 is grounded;

a switch input port SW of the second DC chopper DC/DC is connected to a chip pin SW2; the chip pin SW2 is connected to a positive terminal of the DC power supply VCC through an inductor L2;

a power supply voltage port VCC of the second DC chopper DC/DC is connected to a chip pin VCC; the chip pin VCC is connected to the positive terminal of the DC power supply VCC;

an enable port EN of the second DC chopper DC/DC is connected to a chip pin EN2; the chip pin EN2 is connected to one end of a capacitor C3 and the positive terminal of the DC power supply VCC at the same time; another end of the capacitor C3 is grounded, and a negative terminal of the DC power supply VCC is grounded.

The advantageous effect of the present invention: The present invention provides a circuit structure of a 10G rate OLT terminal transceiver integrated chip based on EPON with EML laser. The combination of multi-rate burst LA, multi-rate continuous LDD and digital modules can well meet both the low-rate and the high-rate signal transmission requirements of the users. The digital module can optimize the transmission quality of the eye diagram, and cooperate with the EML laser to transmit the data to the ONU user end at high speed and long distance. The built-in power management module DC/DC can save peripheral hardware cost and space occupation, and is also conducive to the overall power consumption control of the transceiver integrated chip. Because it is based on the hardware developed by the EPON standard, the cost of all aspects is less than that of the hardware developed by the GPON standard.

DETAILED DESCRIPTION OF THE PREFERRED EMBODIMENT

Figure 1:
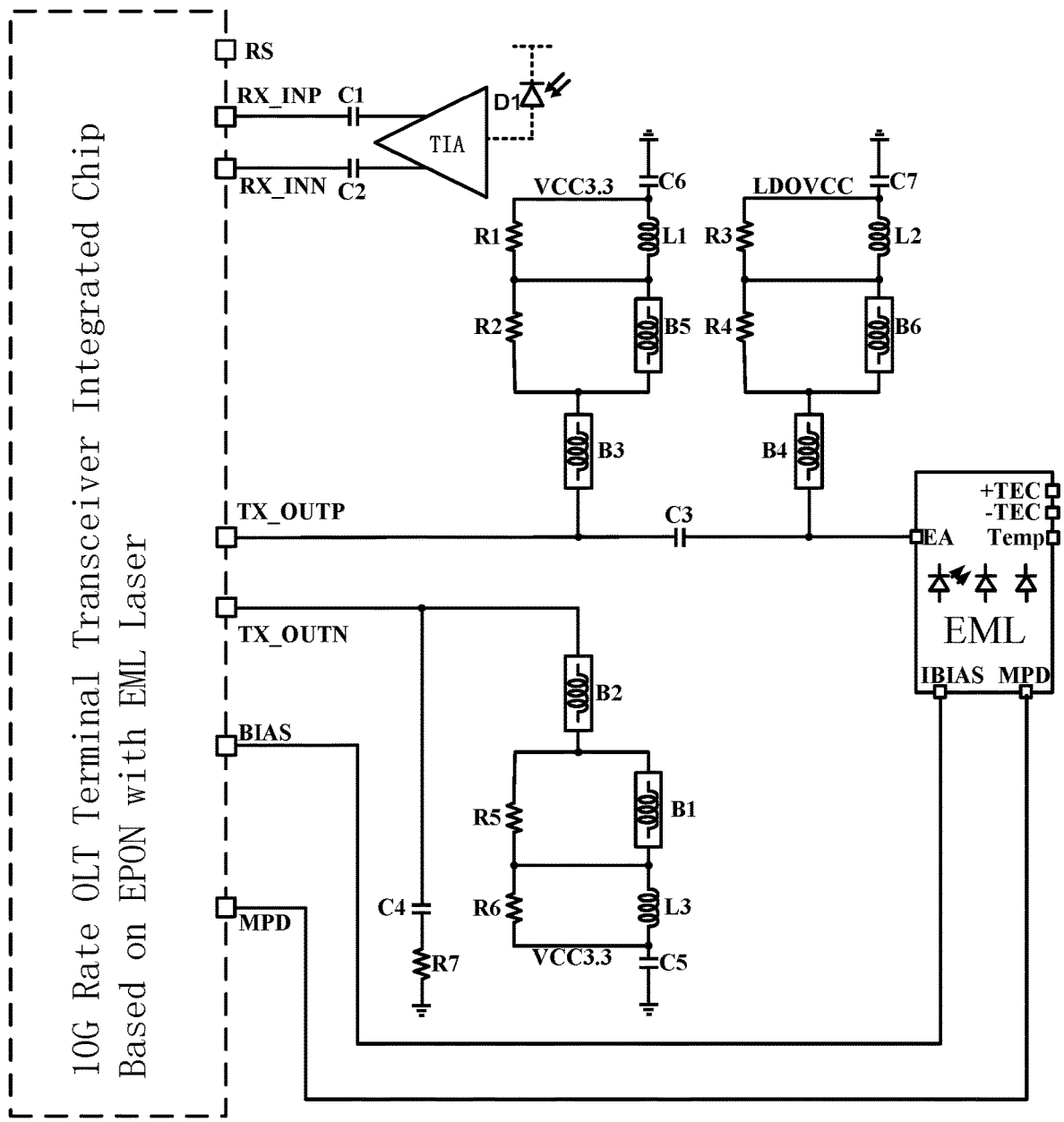
FIG. 1 is a schematic diagram based on EPON with EML laser according to the present invention.

The following will clearly and completely describe the technical solutions in the embodiments of the present invention with reference to the accompanying drawings in the embodiments of the present invention. Clearly, the described embodiments are only some, not all, of the embodiments of the present invention. Based on the embodiments of the present invention, all other embodiments obtained by persons of ordinary skill in the art without creative efforts or inventive steps fall within the protection scope of the present invention.

According to the present invention, a 10G rate OLT terminal transceiver integrated chip based on EPON with EML laser is provided. The high and low rate channels in the receiver (RX) inside the chip, the switchable start-stop clock data recovery (CDR) module in the transmitter (TX) for use with EML laser, the modular and configurable digital part (Digital), and the embedded power management DC/DC which precisely controls the power consumption of the entire chip are the keys to the realization of the present invention.

It should be noted that as long as there is no conflict, the different embodiments or the different features in different embodiments can be combined with each other.

The present invention is further described in conjunction with accompanying drawings and specific embodiment as follows, which is not intended to be limiting.

Preferred Embodiment 1: This embodiment is described below with reference to FIGS. 1-3. According to this embodiment, a 10G rate OLT terminal transceiver integrated chip based on EPON with EML laser comprises: a burst mode receiver RX, a continuous mode transmitter TX, a digital control unit DIGITAL and a power module POWER.

The burst mode receiver RX amplifies an electrical signal which is originated from an optical signal from each ONU client and processed through a burst mode receiver TIA. The burst mode receiver RX configures two channels with different rates and selects one of the two channels to open as a working channel, so the electrical signal is output from the working channel.

The continuous mode transmitter TX receives the electrical signal attenuated by a PCB board, and in response to a degree of attenuation, selects a bypass path BYPASS for transmission or outputs the electrical signal after a signal quality of the electrical signal is processed and improved by a clock data recovery path CDR to drive the EML laser.

The digital control unit DIGITAL controls a path selection of the continuous mode transmitter TX according to an external command.

A host controls the channel selection of the burst mode receiver RX through a chip pin RS.

The power module POWER is arranged to provide power supply to the chip.

The burst mode receiver RX comprises a first input buffer, a 10G rate channel, a 1G rate channel, a level judgment unit and an output blocking unit.

An output signal of the burst transimpedance amplifier TIA of the OLT terminal is connected to an input terminal of the first input buffer through chip pins RX_INP and RX_INN, and the first input buffer sends the received signal to the level judgment unit for judgment, the level judgment unit limits, amplifies and outputs the signal having a level higher than a level threshold through the 10G rate channel or the 1G rate channel.

The 10G rate channel comprises a 10G burst-mode limiting amplifier Burst LA_10G, a 10G rate amplifier A1, and 10G current mode logic output interface output port CML 10G. The 1G rate channel comprises a 1G burst-mode limiting amplifier Burst LA_1G, a 1G rate amplifier A2, and a 1G forward emitter coupled logic output port PECL 1G. An output terminal of the first input buffer is connected with the input terminal of the 10G burst-mode limiting amplifier Burst LA_10G and the input terminal of the 1G burst-mode limiting amplifier Burst LA_1G at the same time, an output terminal of the 10G burst-mode limiting amplifier Burst LA_10G is connected to an input terminal of the 10G current mode logic output interface output port CML 10G, the 10G current mode logic output interface output port CML 10G outputs a 10G channel signal through chip pins OUTP_10G and OUTN_10G, an output terminal of the 1G burst-mode limiting amplifier Burst LA_1G is connected to an input terminal of the 1G forward emitter coupled logic output port PECL 1G, the 1G forward emitter coupled logic output port PECL 1G outputs a 1G channel signal through chip pins OUTP_1G and OUTN_1G.

The level judgment unit determines a selection result by comparing the signal with the signal threshold, and controls an opening and a closing of the 10G rate amplifier A1 and the 1G rate amplifier A2 through the output blocking unit to realize the selection of one of the 10G rate and 1G rate channels.

The working principles of the burst mode receiver RX: The OLT transceiver integrated chip located in the central office corresponds to multiple ONUs at the user end, therefore the receiving terminal RX of the OLT transceiver integrated chip needs to receive bursts of electrical signals of different amplitudes from the ONU terminal (burst TIA has converted optical signals of different amplitudes into electrical signals and then sent them to the limiting amplifier LA of RX). The limiting amplifier LA refers to the two 1 Gbps and rate channels respectively. The in-band noise of the low-rate channel LA is smaller than that of the high-rate channel LA. The low-rate channel uses a low-voltage PECL output with stronger driving capability. The high-rate channel uses CML with faster speed and less distortion to output, and the output swing of the two output modes can be controlled according to the demand. In order to eliminate the interference of input noise and correctly amplify the real electrical signal, the LA is also equipped with a signal detection module Level Detector (Level Judgment Unit) to screen the high and low rate signals respectively. If the signal is less than a certain threshold, the signal path will be closed through the output blocking unit. The level judgment unit and the output blocking unit are arranged internally in the LA.

The continuous mode transmitter TX comprises a second input buffer, a bypass ByPass, a clock data recovery CDR, a EML laser driver, and a bias current control unit;
 one of the bypass ByPass path or the clock data recovery CDR path is selected to activate;
 an attenuated signal formed by an original high-speed electrical signal (the burst data packet) passing through a metal trace on a PCB board is connected to the second input buffer through the chip pins TX_INP and TX_INN, then the second input buffer transmits the attenuated signal to the input terminal of the EML laser driver along the activated path; an output terminal of the EML laser driver is connected to a control terminal of the EML laser through a chip pin TX_OUTP;
 a bias current control unit configures a bias current for the EML laser;
 the host sends a command for turning off the bias current to the chip through a chip pin TXDIS to turn off the continuous mode transmitter TX.

The activation of one of the bypass ByPass path or the clock data recovery CDR path is controlled by digital control unit Digital according to an external command.

The activation of one of the bypass ByPass or the clock data recovery CDR path is controlled through the host automatically switching the path by itself, when the rate is below 8G, the signal attenuation is not serious, and the bypass ByPass is activated; when the rate is 8G-14G, the signal attenuation is serious, and the clock data recovery CDR path is activated under the control of the host.

The working principles of continuous mode transmitter TX: the main channel of the TX part of is capable of receiving and processing continuous electrical signal data streams with a rate of 1-14 Gbps. The original high-speed electrical signal is attenuated after passing through the metal traces on the PCB board, resulting in signal errors. In order to solve the problem of high-speed signal attenuation, CDR (clock data recovery) is added inside the TX to improve the quality of high-speed signal. If the attenuation of the high-speed signal is not serious, it can also be transmitted directly from the ByPass path. The EML laser driver connects the EML laser and some peripheral circuits (resistors R1~R4, inductors L1~L2, capacitors C6~C7, magnetic beads B3~B6) through the pin TX_OUTP, and connects part of the peripheral circuits (resistors R5~R6, inductor L3, capacitor C5, magnetic beads B1~B2) through the pin TX_OUTN, details of which is illustrated in FIG. 1. EML-type lasers support ultra-long-distance (≥100 km) data transmission, and the output modulation voltage provided inside TX can be adjusted according to actual usage (optical power, extinction ratio). The bias current Bias of the EML laser driver need to adjust the current in real time according to the ambient temperature, the luminous efficiency of the laser, and the aging of the laser. Therefore, the bias current control unit cooperates with the APC optical power control module to feed back the average optical power information of the laser collected by the monitoring photodiode MPD, and configure a reasonable current value through the data writing of the digital part. When the host reads that the key parameters of the transceiver chip exceed the reasonable range, it can turn off the transmitting part through the chip pin TXDIS to avoid damage to the EML laser.

The EML laser brings together the electro-absorption modulator EA and the semiconductor cooler TEC at the same time. The Temp pin of the TEC feeds back the voltage converted from the internal temperature of the EML laser to the TEC control chip. According to the operating temperature of the EML laser, the TEC control chip adjusts the ambient temperature of the EML laser in real time through the current flowing through pins +TEC and −TEC to make it work in the best state, Therefore, the current required by the TEC for heat dissipation occupies a large part of the overall power consumption of the optical module. In order to meet the overall power consumption requirement of the optical module, it is necessary to further reduce the power consumption of the integrated transceiver chip.

The activation of one of the bypass ByPass or the clock data recovery CDR path includes the following two configurations:

Type 1: Pre-judgment, and then write the external command into the digital control unit Digital through the SAD pin according to the judgment result, and the digital control unit Digital sends the selection command to the TX. Pre-judgment refers to the selection of the bypass ByPass path or the clock data recovery CDR path, which is judged based on the attenuation of the signal measured by the chip. Before using the chip, first detect the attenuated signal generated after passing through the metal wiring on the PCB board, and check whether the quality of the TX output eye diagram meets the protocol standard. If it meets the standard, it will be transmitted from bypass ByPass, and if it does not meet the standard, CDR will be turned on to optimize the signal quality.

Type 2: The host switches channels by itself. When the rate is below 8G, the signal attenuation is not serious, and ByPass is activated; when the rate is 8G-14G, the signal attenuation is serious, and the host controls the clock data recovery CDR path to optimize signal quality.

The digital control unit Digital comprises a register digital core, an analog-to-digital converter ADC, a I$^2$C slave and temperature sensor Temp Sensor;

an output terminal of the temperature sensor Temp Sensor is connected to a temperature signal input terminal of the register digital core through the analog-to-digital converter ADC;

an input terminal of I$^2$C slave is connected to a pin SCL of a clock chip; an input and output ports of I$^2$C slave are connected to a chip pin SDA of an external command; an output terminal of I$^2$C slave is connected to an external command input terminal of the register digital core, and the register digital core controls a path selection of the continuous mode transmitter TX; the register digital core also realizes a configuration of the burst mode receiver RX and the continuous mode transmitter TX through a control port.

The control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

The control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL; and a modulation voltage peak-to-peak control PEAK_CTRL.

An input terminal of the optical power control port APC is connected to a chip pin MPD for monitoring current.

The working principle of the digital control unit Digital: The digital control unit Digital can complete the internal configuration of the burst mode receiver RX and the continuous mode transmitter TX.

The functions configurable in the burst mode receiver RX are:

eye diagram cross point adjustment CPA, output swing control SW_CTRL, output polarity inversion POL_CTRL, signal loss threshold setting and mode selection LOS_CTRL, etc.

The configurable functions in the continuous mode transmitter TX are:

laser optical power control APC, eye diagram intersection optimization CPA, jitter optimization EQ, eye diagram optimization EO, output polarity inversion POL_CTRL, and modulation voltage peak-to-peak control PEAK_CTRL, etc. The built-in high-precision multi-bit ADC converts the ambient temperature collected by the temperature sensor Temp Sensor into a digital value and then reads it to the outside through the I$^2$C slave data signal line SDA. ADC can also read other quantifiable data to the outside through I$^2$C slave, such as monitoring current value, bias current value, etc. Users can also write digital quantities to the register digital core inside the chip through the master I$^2$C which is external to the chip to optimize the different transmission performance of the integrated transceiver chip.

Figure 2:
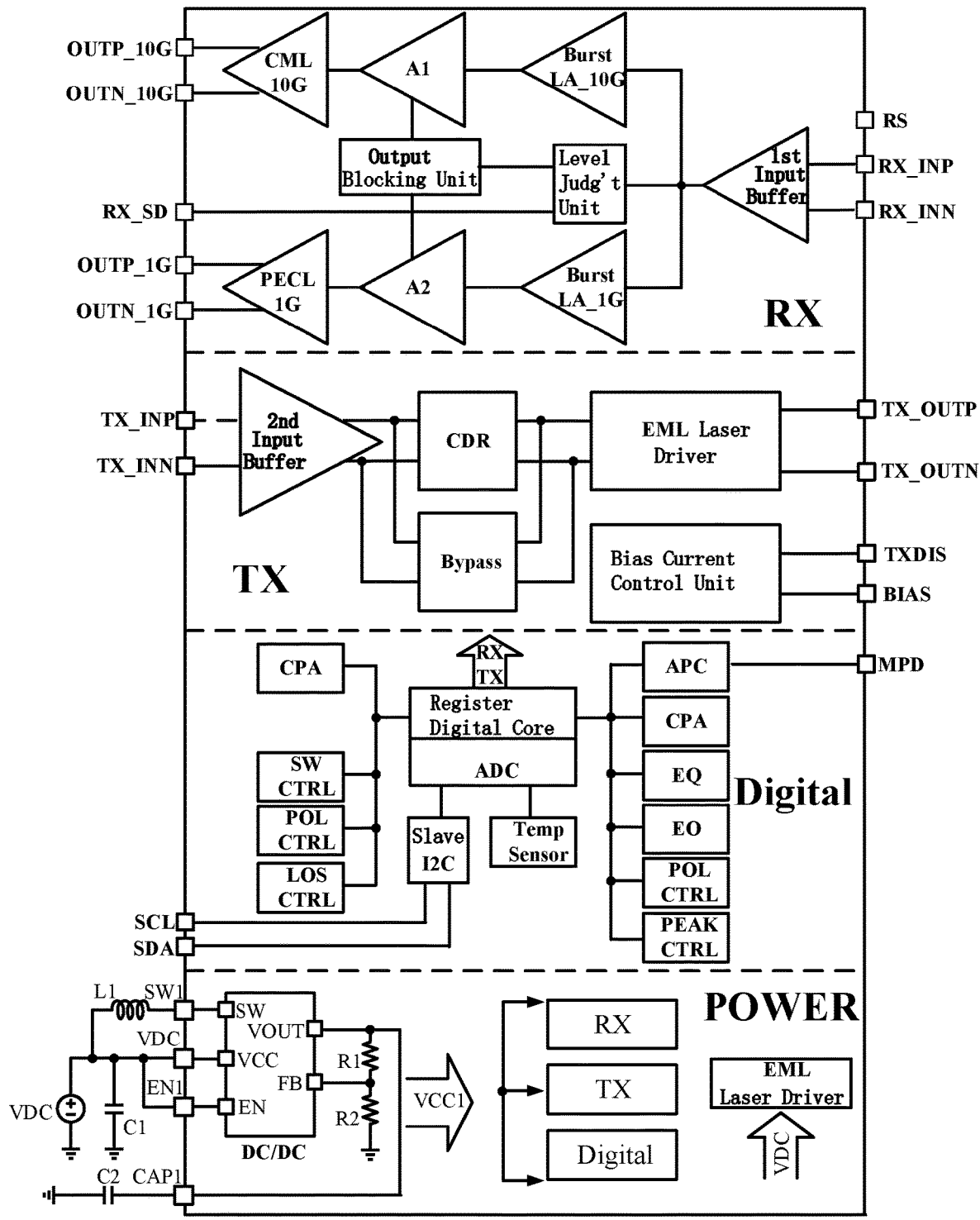
FIG. 2 is a structural schematic diagram of a 10G rate OLT terminal transceiver integrated chip based on EPON with EML laser, with an embodiment 1 of the power module POWER, according to the present invention.

There are two embodiments for the power module POWER:

Embodiment 1: Referring to FIG. 2, the power module POWER comprises a DC power supply VDC, a DC chopper DC/DC, and resistors R1 and R2.

The DC power supply VDC provides working power for the EML laser driver while at the same time the DC chopper DC/DC converts the DC power VDC into a DC power VCC1 and outputs it through the pin VOUT. The DC power supply VCC1 provides the working power for the burst mode receiver RX, the continuous mode transmitter TX and the digital control unit Digital respectively.

The output terminal VOUT of the DC chopper DC/DC is connected to one end of the resistor R1 and the chip pin CAP1 simultaneously; the chip pin CAP1 is grounded through the capacitor C2;

another end of the resistor R1 is simultaneously connected to one end of the resistor R2 and a feedback signal terminal FB of the DC chopper DC/DC;

another end of the resistor R2 is grounded;

a switch input port SW of the DC chopper DC/DC is connected to a chip pin SW1; the chip pin SW1 is connected to a positive terminal of the DC power supply VDC through an inductor L1;

a power supply voltage port VCC of the DC chopper DC/DC is connected to the chip pin VDC; the chip pin VDC is connected to the positive terminal of the DC power supply VDC; and an enable port EN of the DC chopper DC/DC is connected to the chip pin EN1; the chip pin EN1 is connected to one end of the capacitor C1 and the positive terminal of the DC power supply VDC at the same time; another end of the capacitor C1 is grounded, and the negative terminal of the DC power supply VDC is grounded.

Figure 3:
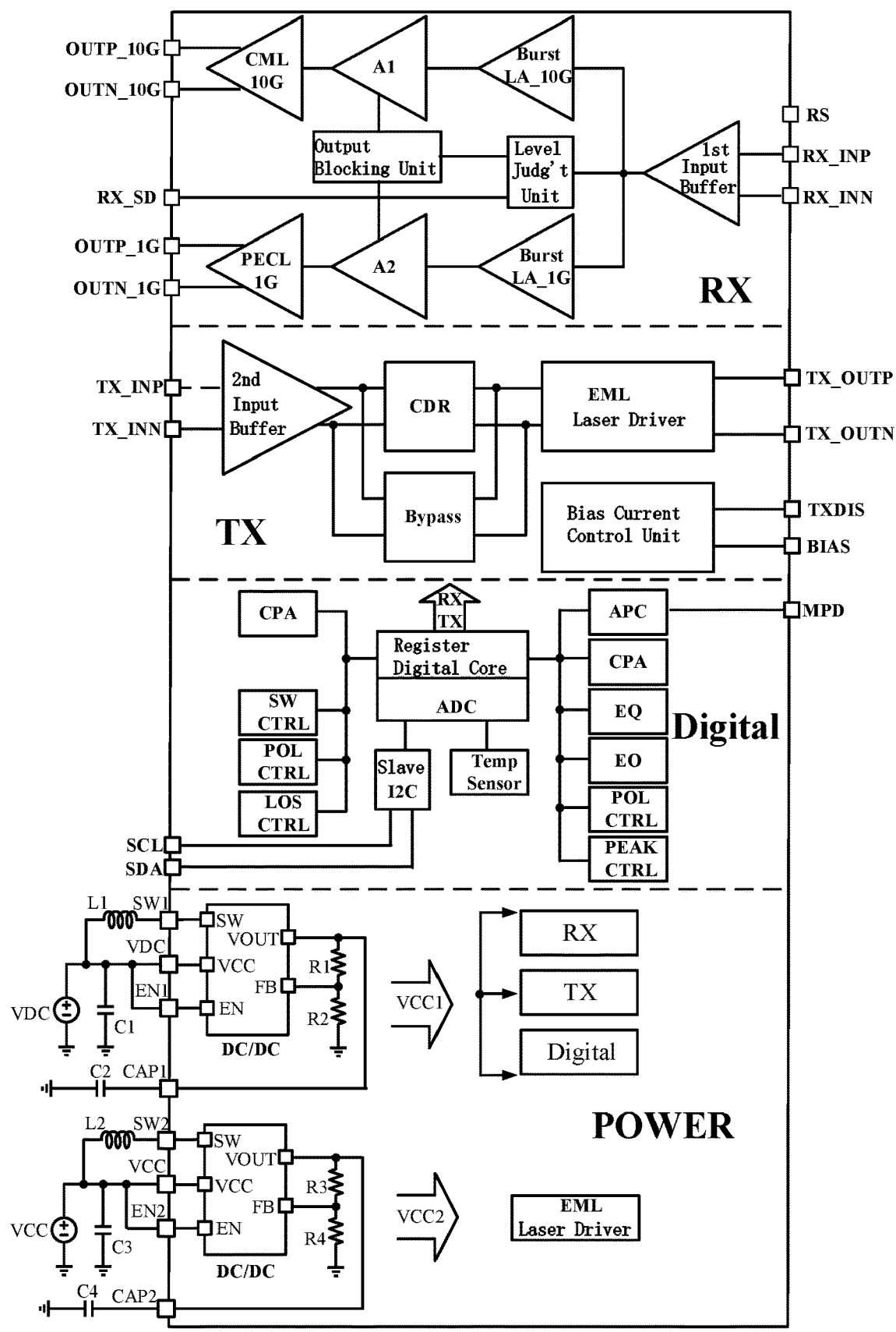
FIG. 3 is a structural schematic diagram of a 10G rate OLT terminal transceiver integrated chip based on EPON with EML laser, with an embodiment 2 of the power module POWER according to the present invention.

Embodiment 2: Referring to FIG. 3, the power module POWER comprises a DC power supply VDC, a DC power supply VCC, a first DC chopper DC/DC, a second DC chopper DC/DC, and resistors R1~R4.

The first DC chopper DC/DC converts the DC power supply VDC into a DC power supply VCC1 and outputs it through the pin VOUT. The DC power supply VCC1 provides the working power for the burst mode receiver RX, the continuous mode transmitter TX and the digital control unit Digital respectively.

The output terminal VOUT of the first DC chopper DC/DC is connected to one end of the resistor R1 and the chip pin CAP1 simultaneously; the chip pin CAP1 is grounded through the capacitor C2.

Another end of the resistor R1 is simultaneously connected to one end of the resistor R2 and a feedback signal terminal FB of the first DC chopper DC/DC.

Another end of the resistor R2 is grounded.

A switch input port SW of the first DC chopper DC/DC is connected to the chip pin SW1; the chip pin SW1 is connected to the positive terminal of the DC power supply VDC through the inductor L1.

A power supply voltage port VCC of the first DC chopper DC/DC is connected to the chip pin VDC; the chip pin VDC is connected to the positive terminal of the DC power supply VDC.

An enable port EN of the first DC chopper DC/DC is connected to the chip pin EN1; the chip pin EN1 is connected to one end of the capacitor C1 and the positive terminal of the DC power supply VDC at the same time; another end of the capacitor C1 is grounded, and the negative terminal of the DC power supply VDC is grounded.

The second DC chopper DC/DC converts the DC power supply VCC into a DC power supply VCC2 and outputs it through a pin VOUT. The DC power supply VCC2 provides the working power for the EML laser driver.

The output terminal VOUT of the second DC chopper DC/DC is connected to one end of the resistor R3 and the chip pin CAP2 simultaneously; the chip pin CAP2 is grounded through the capacitor C4.

Another end of the resistor R3 is simultaneously connected to one end of the resistor R4 and a feedback signal terminal FB of the second DC chopper DC/DC;

Another end of the resistor R4 is grounded.

A switch input port SW of the second DC chopper DC/DC is connected to the chip pin SW2; the chip pin SW2 is connected to the positive terminal of the DC power supply VCC through the inductor L2.

A power supply voltage port VCC of the second DC chopper DC/DC is connected to the chip pin VCC; the chip pin VCC is connected to the positive terminal of the DC power supply VCC.

An enable port EN of the second DC chopper DC/DC is connected to the chip pin EN2; the chip pin EN2 is connected to one end of the capacitor C3 and the positive terminal of the DC power supply VCC at the same time; another end of the capacitor C3 is grounded, and the negative terminal of the DC power supply VCC is grounded.

The key point of the power management part of the present invention is the built-in DC/DC module.

The traditional power supply scheme of the transceiver integrated chip with EML laser is to provide the power supply voltage VDC to the transceiver integrated chip, and then reduce VDC to VCC1 through the LDO inside the chip. For example, 3.3V is reduced to 1.8V inside the chip, and the efficiency of LDO as a power supply is usually low. The overall power consumption of the chip in this type of scheme is 870 mW.

The advantages of the power supply part of the present invention will be analyzed below in conjunction with two specific embodiments.

Embodiment 1: Referring to FIG. 2 of the drawings, VCC=3.3V, VCC1=1.8V, a DC/DC with higher power supply efficiency is used to replace LDO with low power supply efficiency. The power supply voltage 1.8V generated by DC/DC is supplied to the RX part, TX part, and digital part. The EML laser driver of the TX part still uses a 3.3V power supply voltage. The overall power consumption of this embodiment is 710 mW, saving 160 mW power consumption.

Compared with the traditional power supply solution with a DC/DC chip external to the transceiver integrated chip with EML laser, an initial 3.3V of the power supply voltage is reduced to 1.8V and then supplied to the integrated transceiver chip. The traditional DC/DC chip needs to be purchased separately, which is expensive and occupies PCB board area, thus not conducive to reducing the cost and miniaturization of optical modules. Moreover, the generalized DC/DC cannot meet the increasingly digital design requirements of transceiver integrated chips. According to the present invention, a DC/DC is built into the integrated transceiver chip based on the power consumption requirement of the integrated transceiver chip, and this customized DC/DC has the characteristics of small area and strong performance. Therefore, the cost and power consumption of the whole module are reduced.

The DC/DC is further optimized in terms of area. For example, the generation of the reference voltage can be uniformly provided by the on-chip bandgap reference voltage module. The size of the switch tube SW, which occupies the largest chip layout area, can be reasonably designed according to the overall power consumption requirements of the chip. After area optimization in various aspects, the area of the DC/DC module is only 0.7 mm$^2$, while the footprint of a single DC/DC is 4 mm$^2$. Adjusting the resistance of resistors R1 and R2 can change the output voltage (as long as the transceiver integrated chip can still guarantee the performance under low voltage conditions, the 1.8V power supply voltage can also be lowered to further reduce the overall power consumption).

Embodiment 2: Referring to FIG. 3 of the drawings, two DC/DC modules are designed. The DC/DC module is designed into multiple voltage output modes to meet the different power domains in the chip. For example, in the design of two voltage output ports of 3.6V and 1.8V, VCC=3.3V, boost output VCC2=3.6V for EML laser driver, and VDC=3.3V, step-down output VCC1=1.8V for RX part, TX part, digital part. DCDC can step up or step down, depending on performance requirements. The ways to adjust the output voltage include laser trimming and fuse trimming, one-time programmable and register programming, etc.

According to the present invention, the 10G rate OLT terminal transceiver integrated chip based on EPON and EML laser uses a high and low speed dual-channel design at the receiving end RX, and its signal detection is also divided into two corresponding parts, which improves the detection accuracy and facilitates diversified choices for users. A high-speed clock data recovery unit CDR is built in the transmitter TX to ensure the integrity of the electrical signal to be transmitted, which is conducive to the laser emitting high-quality light. In order to drive ultra-long-distance EML lasers, the built-in EML laser driver cooperates with the APC module to quickly and adaptively adjust the bias current so that the laser can obtain the best light-emitting state. In the digital control unit, there are built-in multi-bit registers, high-precision ADC and slave I²C. All kinds of key data are transmitted to the outside through the SDA signal line, and the digital quantities of related modules with optimized performance can also be written through this line to ensure the high quality of the sending and receiving signal of the transceiver integrated chip. The most important part is to ensure that the 10G rate OLT transceiver integrated chip based on EPON and EML laser can meet the power consumption requirements in the industry, and a diversified and configurable DC/DC is tailored to be embedded in the chip. It has advantages in performance and area, and reduces the design cost and occupied area of peripheral circuits.

Although the present invention is described herein with reference to specific embodiments, it should be understood that these embodiments are merely illustrative of the principles and applications of the present invention. It is therefore to be understood that numerous modifications may be made to the exemplary embodiments and that other arrangements may be devised without departing from the spirit and scope of the present invention as defined by the appended claims. It shall be understood that different dependent claims and features described herein may be combined in a different way than that described in the original claims. It should also be appreciated that features described in connection with individual embodiments can be used in other described embodiments.

What is claimed is:

1. A 10G rate OLT terminal transceiver integrated chip based on EPON with EML laser, comprising:
    a burst mode receiver RX, a continuous mode transmitter TX and a digital control unit DIGITAL, and a power module POWER;
    wherein the burst mode receiver RX amplifies an electrical signal which is originated from an optical signal from each ONU client and processed through a burst mode receiver TIA, and the burst mode receiver RX comprises two channels with different rates and selects one of the two channels to open, defining a working channel, so the electrical signal is output from the working channel;
    the continuous mode transmitter TX receives the electrical signal attenuated by a PCB board, and in response to a degree of attenuation, selects a bypass path BYPASS for transmission or outputs the electrical signal after a signal quality of the electrical signal is processed and improved by a clock data recovery path CDR to drive the EML laser;
    the digital control unit DIGITAL controls a path selection of the continuous mode transmitter TX according to an external command;
    a host controls the channel selection of the burst mode receiver RX through a chip pin RS; and
    the power module POWER is arranged to provide power supply to the chip;
    wherein the power module POWER comprises a DC power supply VDC, a DC chopper DC/DC, and resistors R1 and R2;
    wherein the DC power supply VDC provides working power for the EML laser driver while the DC chopper DC/DC converts the DC power supply VDC into a DC power supply VCC1 and outputs it through a pin VOUT; the DC power supply VCC1 provides working power for the burst mode receiver RX, the continuous mode transmitter TX and the digital control unit Digital respectively;
    an output terminal VOUT of the DC chopper DC/DC is connected to one end of the resistor R1 and a chip pin CAP1 simultaneously; the chip pin CAP1 is grounded through a capacitor C2;
    another end of the resistor R1 is simultaneously connect to one end of the resistor R2 and a feedback signal terminal FB of the DC chopper DC/DC;
    another end of the resistor R2 is grounded;
    a switch input port SW of the DC chopper DC/DC is connected to a chip pin SW1, the chip pin SW1 is connected to a positive terminal of the DC power supply VDC through and inducer L1,
    a power supply voltage port VCC of the DC chopper DC/DC is connected to a chip pin VDC; the chip pin VDC is connected to the positive terminal of the DC power supply VDC; and
    an enable port EN of the DC chopper DC/DC is connected to a chip pin EN1; the chip pin EN1 is connected to one end of a capacitor C1 and the positive terminal of the DC power supply VDC at the same time; another end of the capacitor C1 is grounded, and a negative terminal of the DC power supply VDC is grounded.

2. The 10G rate OLT terminal transceiver integrated chip based on EPON with EML laser according to claim 1, wherein the burst mode receiver RX comprises a first input buffer, the two channels, a level judgment unit and an output blocking unit, wherein the two channels are a 10G rate channel and a 1G rate channel;
    wherein an output signal of the burst transimpedance amplifier TIA of the OLT terminal is connected to an input terminal of the first input buffer through chip pins RX_INP and RX_INN, and the first input buffer sends the received signal to the level judgment unit for judgment, the level judgment unit limits, amplifies and outputs the signal having a level higher than a level threshold through the 10G rate channel or the 1G rate channel;
    the 10G rate channel comprises a 10G burst-mode limiting amplifier Burst LA_10G, a 10G rate amplifier A1, and 10G current mode logic output interface output port CML 10G;
    the 1G rate channel comprises a 1G burst-mode limiting amplifier Burst LA_1G, a 1G rate amplifier A2, and a 1G forward emitter coupled logic output port PECL 1G;
    an output terminal of the first input buffer is connected with the input terminal of the 10G burst-mode limiting amplifier Burst LA_10G and the input terminal of the 1G burst-mode limiting amplifier Burst LA_1G at the same time,
    an output terminal of the 10G burst-mode limiting amplifier Burst LA_10G is connected to an input terminal of the 10G current mode logic output interface output port CML 10G, the 10G current mode logic output interface output port CML 10G outputs a 10G channel signal through chip pins OUTP_10G and OUTN_10G, an output terminal of the 1G burst-mode limiting amplifier Burst LA_1G is connected to an input terminal of the 1G forward emitter coupled logic output port PECL 1G, the 1G forward emitter coupled logic output port PECL 1G outputs a 1G channel signal through a chip pin OUTP_1G and OUTN_1G;

the level judgment unit determines a selection result by comparing the signal with the signal threshold, and controls an opening and a closing of the 10G rate amplifier A1 and the 1G rate amplifier A2 through the output blocking unit to realize the selection of one of the 10G rate and 1G rate channels.

3. The 10G rate OLT terminal transceiver integrated chip based on EPON with EML laser according to claim 2, wherein the continuous mode transmitter TX comprises a second input buffer, a bypass ByPass, a clock data recovery CDR, a EML laser driver, and a bias current control unit, wherein one of the bypass ByPass path or the clock data recovery CDR path is selected to activate, an attenuated signal formed by an original high-speed electrical signal (the burst data packet) passing through a metal trace on a PCB board is connected to the second input buffer through the chip pins TX_INP and TX_INN, then the second input buffer transmits the attenuated signal to the input terminal of the EML laser driver along the activated path; an output terminal of the EML laser driver is connected to a control terminal of the EML laser through a chip pin TX_OUTP;

a bias current control unit configures a bias current for the EML laser;

the host sends a command for turning off the bias current to the chip through a chip pin TXDIS to turn off the continuous mode transmitter TX.

4. The 10G rate OLT terminal transceiver integrated chip based on EPON with EML laser according to claim 3, wherein the activation of one of the bypass ByPass or the clock data recovery CDR path is controlled by the digital control unit DIGITAL according to an external command.

5. The 10G rate OLT terminal transceiver integrated chip based on EPON with EML laser according to claim 3, wherein the activation of one of the bypass ByPass path or the clock data recovery CDR path is controlled by the host switching a path automatically by itself, if a detected rate of the original high-speed electrical signal is below 8G, the signal attenuation is not serious, and the bypass ByPass path is activated; if the detected rate of the original high-speed electrical signal is 8G-14G, the signal attenuation is serious, and the clock data recovery CDR path is activated by the host.

6. The 10G rate OLT terminal transceiver integrated chip based on EPON with EML laser according to claim 3, wherein the digital control unit DIGITAL comprises a register digital core, an analog-to-digital converter ADC, a I²C slave and a temperature sensor TEMP SENSOR;

wherein an output terminal of the temperature sensor TEMP SENSOR is connected to a temperature signal input terminal of the register digital core through the analog-to-digital converter ADC;

an input terminal of I²C slave is connected to a pin SCL of a clock chip; an input and output ports of the I²C slave are connected to a chip pin SDA of an external command; an output terminal of the I²C slave is connected to an external command input terminal of the register digital core, and the register digital core controls a path activation of the continuous mode transmitter TX; the register digital core also realizes a configuration of the burst mode receiver RX and the continuous mode transmitter TX through control ports.

7. The 10G rate OLT terminal transceiver integrated chip based on EPON with EML laser according to claim 4, wherein the control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

8. The 10G rate OLT terminal transceiver integrated chip based on EPON with EML laser according to claim 1, wherein the control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL; and a modulation voltage peak-to-peak control PEAK_CTRL;

wherein an input terminal of the optical power control port APC is connected to a chip pin MPD for current monitoring.

9. The 10G rate OLT terminal transceiver integrated chip based on EPON with EML laser according to claim 1, wherein the power module POWER comprises a DC power supply VDC, a DC power supply VCC, a first DC chopper DC/DC, a second DC chopper DC/DC, and resistors R1-R4;

wherein the first DC chopper DC/DC converts the DC power supply VDC into a DC power supply VCC1 and outputs it through a pin VOUT; the DC power supply VCC1 provides working power for the burst mode receiver RX, the continuous mode transmitter TX and the digital control unit Digital respectively;

an output terminal VOUT of the first DC chopper DC/DC is connected to one end of the resistor R1 and a chip pin CAP1 simultaneously; the chip pin CAP1 is grounded through a capacitor C2;

another end of the resistor R1 is simultaneously connected to one end of the resistor R2 and a feedback signal terminal FB of the first DC chopper DC/DC;

another end of the resistor R2 is grounded;

a switch input port SW of the first DC chopper DC/DC is connected to a chip pin SW1; the chip pin SW1 is connected to a positive terminal of the DC power supply VDC through an inductor L1;

a power supply voltage port VCC of the first DC chopper DC/DC is connected to a chip pin VDC; the chip pin VDC is connected to the positive terminal of the DC power supply VDC;

an enable port EN of the first DC chopper DC/DC is connected to a chip pin EN1; the chip pin EN1 is connected to one end of a capacitor C1 and the positive terminal of the DC power supply VDC at the same time; another end of the capacitor C1 is grounded, and a negative terminal of the DC power supply VDC is grounded;

the second DC chopper DC/DC converts the DC power supply VCC into a DC power supply VCC2 and outputs it through a pin VOUT; the DC power supply VCC2 provides working power for the EML laser driver;

the output terminal VOUT of the second DC chopper DC/DC is connected to one end of the resistor R3 and a chip pin CAP2 simultaneously; the chip pin CAP2 is grounded through a capacitor C4;

another end of the resistor R3 is simultaneously connected to one end of the resistor R4 and a feedback signal terminal FB of the second DC chopper DC/DC;

another end of the resistor R4 is grounded;

a switch input port SW of the second DC chopper DC/DC is connected to a chip pin SW2; the chip pin SW2 is connected to a positive terminal of the DC power supply VCC through an inductor L2;

a power supply voltage port VCC of the second DC chopper DC/DC is connected to a chip pin VCC; the chip pin VCC is connected to the positive terminal of the DC power supply VCC;

an enable port EN of the second DC chopper DC/DC is connected to a chip pin EN2; the chip pin EN2 is connected to one end of a capacitor C3 and the positive terminal of the DC power supply VCC at the same time; another end of the capacitor C3 is grounded, and a negative terminal of the DC power supply VCC is grounded.

\* \* \* \* \*